(12) United States Patent
Chizhov et al.

(10) Patent No.: US 6,747,746 B2
(45) Date of Patent: Jun. 8, 2004

(54) SYSTEM AND METHOD FOR FINDING THE CENTER OF ROTATION OF AN R-THETA STAGE

(75) Inventors: Ilya Chizhov, Oakland, CA (US); Martin Ebert, Fremont, CA (US)

(73) Assignee: Therma-Wave, Inc., Fremont, CA (US)

( * ) Notice: Subject to any disclaimer, the term of this patent is extended or adjusted under 35 U.S.C. 154(b) by 225 days.

(21) Appl. No.: 10/044,208

(22) Filed: Jan. 11, 2002

(65) Prior Publication Data

US 2003/0025919 A1 Feb. 6, 2003

Related U.S. Application Data

(60) Provisional application No. 60/305,761, filed on Jul. 16, 2001.

(51) Int. Cl.⁷ .............................................. G01B 11/14
(52) U.S. Cl. ........................................ 356/614; 438/135
(58) Field of Search ................................ 356/614–624, 356/138–155, 399; 348/126, 135

(56) References Cited

U.S. PATENT DOCUMENTS 4,695,982 A    9/1987   Preysman .................... 364/506
5,851,102 A   12/1998   Okawa et al. ............... 414/783
6,320,609 B1  11/2001   Buchanan et al. ........... 348/126

FOREIGN PATENT DOCUMENTS

| EP | 0 971 254 | 7/1999 | ............ G02B/7/00 |
| JP | 60084583 | 4/1985 | ............ H01L/21/30 |
| JP | 06133496 | 6/1994 | ............ H01L/21/68 |

*Primary Examiner*—Richard A. Rosenberger
*Assistant Examiner*—Vincent P. Barth
(74) *Attorney, Agent, or Firm*—Stallman & Pollock LLP (57) ABSTRACT

An optical inspection system and method which uses a procedure for determining an offset between a field of view and a center or rotation of an R-theta stage, or polar coordinate stage. Determining this offset allows the precise location of a site being inspected on a wafer to be determined. The system and method take advantage of the fact that in a R-theta system there can be only two positions for the R-theta stage that will position a particular site under the lens of the imaging system of the optical inspection system. By moving the stage from a first position where a particular site is positioned in the field of view, to the second position where the particular site is positioned in the field of view, the offset can be determined.

21 Claims, 6 Drawing Sheets

SYSTEM AND METHOD FOR FINDING THE CENTER OF ROTATION OF AN R-THETA STAGE

RELATED APPLICATION

The present application claims the benefit of U.S. Provisional Application Serial No. 60/305,761, filed Jul. 16, 2001, titled ALGORITHM FOR FINDING THE CENTER OF ROTATION OF AN R-THETA STAGE, which is incorporated herein by reference.

TECHNICAL FIELD

Optical metrology systems are used for inspecting micron, and submicron level details of semiconductor wafers. The present invention relates to such a system and provides for determining the position of components of the system relative to other components of the system, so that the precise location of sites being inspected on the wafer can be determined.

BACKGROUND OF THE INVENTION

Optical metrology systems are used in the semiconductor industry to image and measure properties of semiconductor wafers. Typically, the wafers are supported on a movable stage and scanned with respect to an optical probing beam. In the past, the most commonly used type of system had controls which allowed a user to move the stage in both the X and Y directions. These X-Y stages could also be combined with a rotational mounting. The optical metrology systems are typically provided with optics and imaging systems so the operator can view the wafer.

In order to reduce the footprint of the optical metrology system R-theta stages, also referred to as polar coordinate stages, were developed which can move the wafer along one linear axis (R) and rotate the wafer about a center of rotation. Such a stage can be used to align any portion of the wafer with a probe beam and the imaging system while using up less space than a conventional X-Y stage.

One problem with using an imaging system with a R-theta stage is that as the stage is rotated, the field of view also rotates. Accordingly, it is desirable to compensate for this rotation of the field of view. A discussion of one system which provides an approach for dealing with the effect of the rotation of the field of view is discussed in the European Patent Application, EP 0 971 254, published Dec. 1, 2000; and U.S. Pat. No. 6,320,609 B1. These references are hereby incorporated herein by reference.

Figure 1:
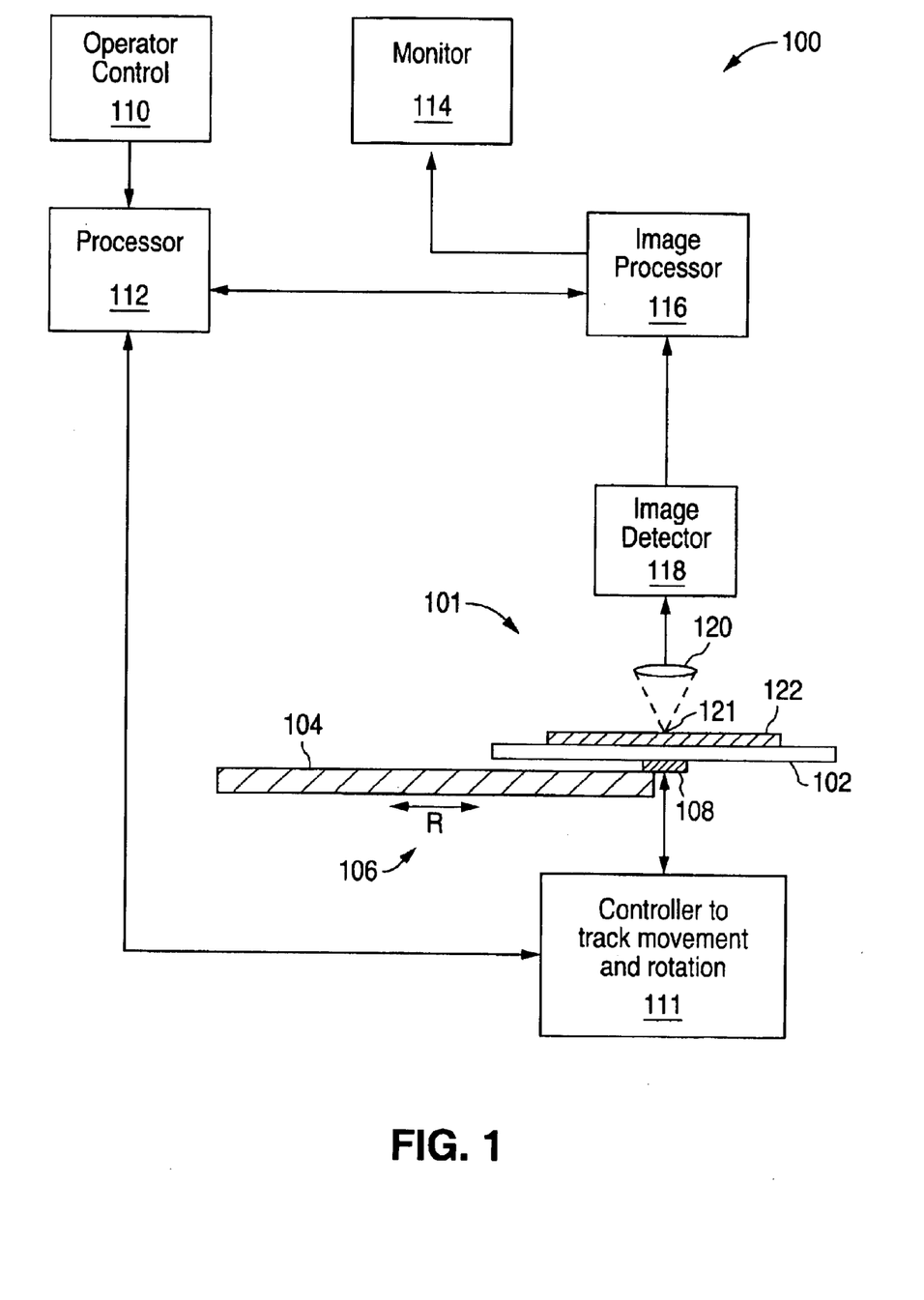
FIG. 1 is diagram showing an optical metrology system of the invention.

FIG. 1 of the '609 patent shows a view of a prior art X Y stage, where the stage can be moved in both the X and Y direction. These prior art systems can also allow for the user to rotate the stage. By moving the stage in both the X and Y direction the user can align the center of rotation of the stage such that it is aligned with the center of the field of view of the optical imaging system. Algorithms that were used for determining the position of the field of view of the optical imaging system, or a lens of the imaging system, relative to the center of rotation of the stage took advantage of the ability to precisely control the movement of the stage in both the X and Y direction. Specifically, these prior algorithms make use of three degrees of freedom provided by a X-Y-Theta stage, and are dependent on the ability to bring any point on the stage (and a wafer mounted on the stage) to the center of the field of view after an arbitrary theta rotation.

The system described in the '609 patent assumes that the center of rotation of the polar coordinate stage can be made nearly coincident with the center of the field of view of the imaging system. In practice, this alignment is difficult, if not impossible. When the center of the field of view of the optical imaging system is not aligned with the center of rotation of the stage in the home position, and where this offset is not accounted for, the system cannot accurately position a particular location on a wafer being inspected at the center of the field of view. Accordingly, it would be desirable to determine the exact amount of displacement of the center of rotation of the stage from the center of the field of view of the optical imaging system and correct for that offset, so that the precise location of a site on a wafer sample can be accurately controlled.

SUMMARY

The present invention is directed to a system and a method for determining an offset between a point in the field of view of an optical imaging system of an inspection system and a center of rotation of a polar coordinate stage. The system and method take advantage of the fact that a distinctive site on a wafer being inspected can be positioned in the field of view with the polar coordinate stage being in one of two possible orientations. This is done by positioning the polar coordinate stage in a first position with a site at a particular location in the field of view, and then positioning the polar coordinate stage in a second position where the site is again positioned at the particular location in the field of view. The processor system of the inspection system is then used to calculate the offset, based on the movement of the stage necessary to change the position of the polar coordinate stage from the first position to the second position.

DETAILED DESCRIPTION

A system and method have been developed for finding the center of rotation of an R-theta stage, also referred to as a polar coordinate stage, relative to an objective lens, or a field of view, of an optical imaging system. The optical inspection system of the present invention is shown in FIG. 1. The R-theta stage 101 has two degrees of freedom. The R-theta stage includes a track 104, and a chuck 102 which is coupled to the track such that it can be moved linearly along the track along the R axis 106. In one embodiment the track 104 has a length of approximately 160 mm and is used for measuring wafers having diameter of 300 mm. The R-theta stage 101 includes a rotator 108, such that the chuck 102 can be rotated about a center of rotation. The user can control the position of the chuck 102 using operator controls 110 which are coupled to the processor system 112.

The optical metrology system 100 includes an optical imaging system, which includes a monitor 114, an image processor 116 and an image detector 118. The image detector receives a probe beam which has been reflected off a detection point 121 on a wafer 122 that is positioned on the chuck, and transmitted through an objective lens 120. The wafer 122 is secured to the chuck 102, such that its position relative to the optical imaging system can be changed by changing the position of the chuck 102. The probe beam can include a white light source, or other light source on energy source suitable for use by an optical imaging system. The image detector 118 is coupled with an image processor 116, which uses the information obtained by the image detector 118 to generate an image which is displayed on the monitor 114.

It should be noted that portions of the discussion herein discuss positioning distinctive sites under a lens of the imaging system. In some embodiments, however, the system might be implemented without a lens. In such a system, the teachings herein are still applicable. Generally, when a site appears at the center of a field of view of an imaging system it is positioned at a detection point under the lens of the imaging system. As will be clear to one in the art, using the present system one could account for the offset between the field of view of an imaging system and the center of rotation of a stage, whether or not a "lens" is part of the system.

Figure 2:
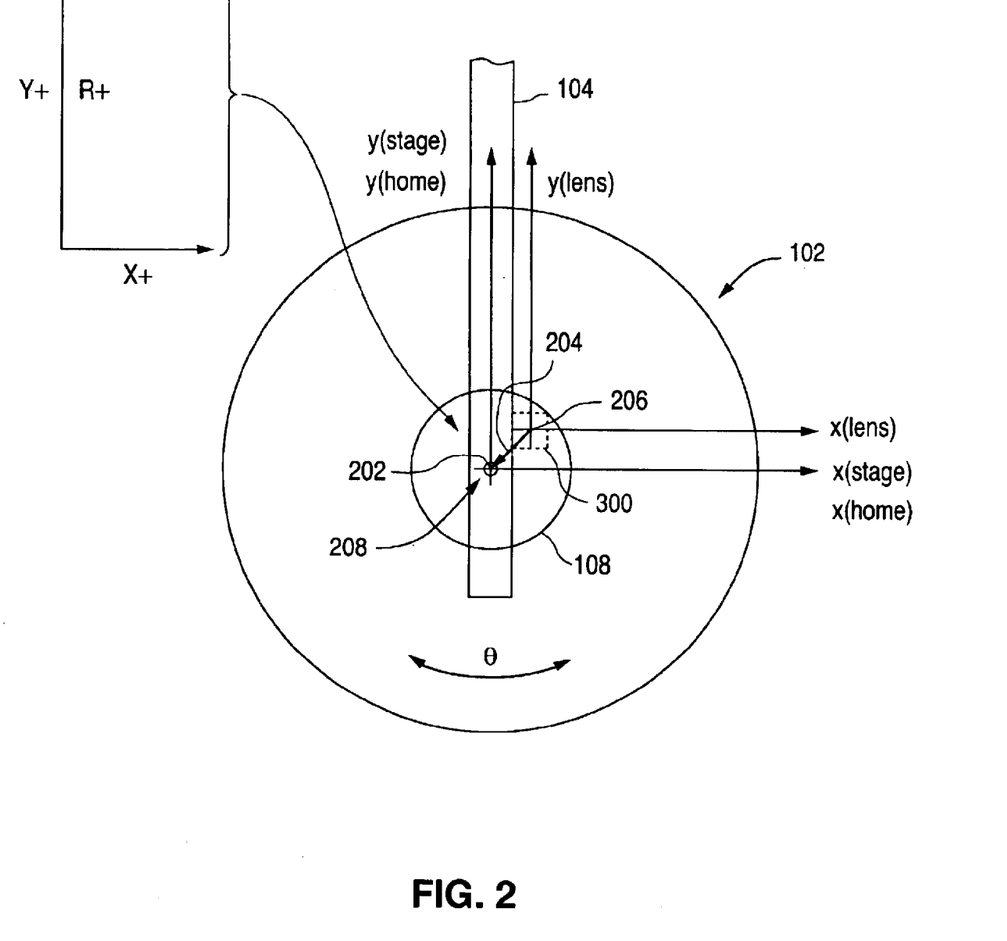
FIG. 2 is a plan view of the R-theta stage of the metrology system.

FIG. 2 shows a view looking down on the track 104 of the R-theta stage 101. The chuck 102 is mounted to the track 104 such that it can be moved along the track 104, and it can be rotated about a center of rotation 202. The objective lens 120 is positioned at point 206; this position is also the center of the field of view 300 of the imaging system. Ideally the lens 120, and the center of the field of view of the imaging system, would be over the center of rotation 202 when the stage 102 is in the home position 208.

In reality it is not practical to precisely mechanically align the center of the field of view of the imaging system over the center of rotation 202 in the home position 208, and thus there is a small offset distance 204. With reference to the R-theta stage system in FIG. 2 there are at most two positions of the stage (as opposed to infinite number for the X-Y-theta stages) for which the same point on the stage, or wafer, is positioned at the center of the field of view of the imaging system. Indeed, in many R-theta stage systems, sites on the wafer will be viewable under the lens 120, at the center of the field of view, in only one position, because in such systems the travel distance of the wafer 122 on the track is generally the radius of the wafer being inspected. In an embodiment of the present invention, the travel distance of the wafer on the track is slightly more than the radius of the wafer being inspected, so that a distinctive site 210, close to the center of rotation of the R-theta stage, can be selected and positioned under the lens 120 at the center of the field view 300 with the R-theta stage in one of two different positions (as is described in more detail below).

Once a distinctive site 210 has been positioned at the center of the field of view 300, which in many embodiments would correspond to the distinctive site 210 being positioned under the lens 120, the chuck can be moved to a second position to bring the distinctive site to the center field of view a second time by rotating the chuck 102, 180 degrees and moving it radially by −2R, where R is the distance which the R-theta stage is moved from the home position when the site is initially positioned under at the center of the field of view.

The procedure described herein determines the coordinates of the objective lens 120, and thus the center of the field view with respect to the center of rotation 202 of the R-theta stage in stage home coordinate system. The procedure uses software which programs the processor system 112, and the hardware required to move the chuck 102 of the R-theta stage 101, such as the track 104, and motors which are coupled to the chuck to move it along the track, and to rotate the chuck 102. The processor system 112 can receive operator input signals from the operator control 110, and based on these signals cause the controller 111 to change the position of the chuck. The processor system can also be programmed to automatically move the chuck.

The system and method uses the following coordinate system. The home coordinate system (shown as x(home) and y(home)) has an origin 208 which is at the same point as the center of rotation 202 of the R-theta stage 102 when it is in home position (i.e. (0,0)). The Y+ axis is directed along the axis of positive radial motion (R+).

The lens coordinate system (shown as x(lens) and y(lens)) has a center which is taken at the center of the objective lens 120 (as observed on the monitor 114). The lens coordinate system can also be considered as the center of the field of view 300 of the system. For simplicity the discussion herein will refer to this coordinate system as the lens coordinate system. The Y+ axis is the same as the Y+ axis of the home system (i.e. along the axis of positive radial motion of the stage).

The stage coordinate system (x(stage) and y(stage)) has a center of rotation 202 which is the mechanical center of the chuck of the R-theta stage. This coordinate system rotates and translates with the stage. A point on a wafer 122 mounted on the R-theta stage has the same coordinates in the stage coordinate system regardless of the motion of the stage, while its coordinates in home and lens systems change as the stage is moved.

The fist step for determining the center of rotation of the R-theta stage 202 in the home position relative to the objective lens 120, or the field of view 300, is to adjust the lateral position (the lateral direction being perpendicular to the track 104) of the R-theta stage 101 (which is movable) with respect to the objective lens 120 of imaging system 118 (which cannot be moved laterally) to minimize misalignment between the center of rotation of the R-theta stage 102 and the lens 120. In one embodiment this adjustment can be done using mechanical screws (not shown). By rotating the screws the lateral position of the center or rotation of the stage 101 can be brought in close alignment (i.e. about 10–20 microns) with the lateral position of the objective lens 120.

Figure 3:
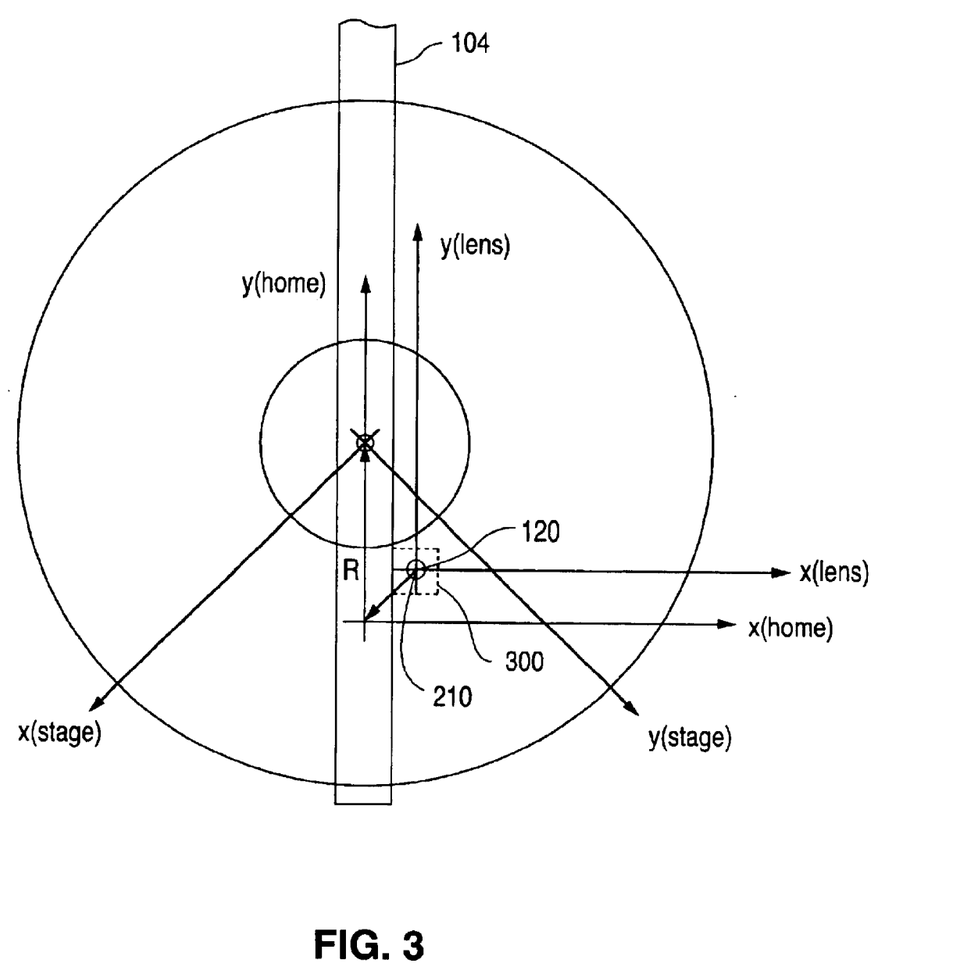
FIG. 3 is a view of a step in the process of determining an offset between a field of view and a center rotation of the R-theta stage.

Once the R-theta stage 101 has been brought in close alignment with the objective lens 120, the wafer 122 mounted in the R-theta stage 101 can be observed using the optical imaging system. At this point the user can select a distinctive site on the wafer by using the operator control 110 to move the chuck of the R-theta stage so that the distinctive site is in the center of the field of view 300 shown on the monitor 114, which corresponds to the site 210 being under the lens 120. The distinctive site 210 should be close to the center wafer should be selected, since the offset (discussed below) will be smaller. This process of selecting a distinctive site 210 is shown in FIG. 3, where the distinctive site 210 is positioned under the objective lens 120. In one embodiment positioning the distinctive site 210 under the objective lens 120 would result in the distinctive site 210 being located at the center of the field view 300 of the imaging system. It should be noted that it need not be center of field of view, but this step should result in the distinctive site being positioned somewhere in the field of view 300 of the imaging system. Note that in FIG. 3 the home coordinate system and the lens coordinate systems have not changed, but the stage coordinate system has changed such that distinctive site 210 is positioned directly under the objective lens 120. This is achieved by rotating the R-theta stage approximately 130 degrees in the clockwise direction and moving the stage along the track a distance R. (The angle of rotation and distance are given for illustrative purposes, any number of different positions could have been selected.)

Figure 4:
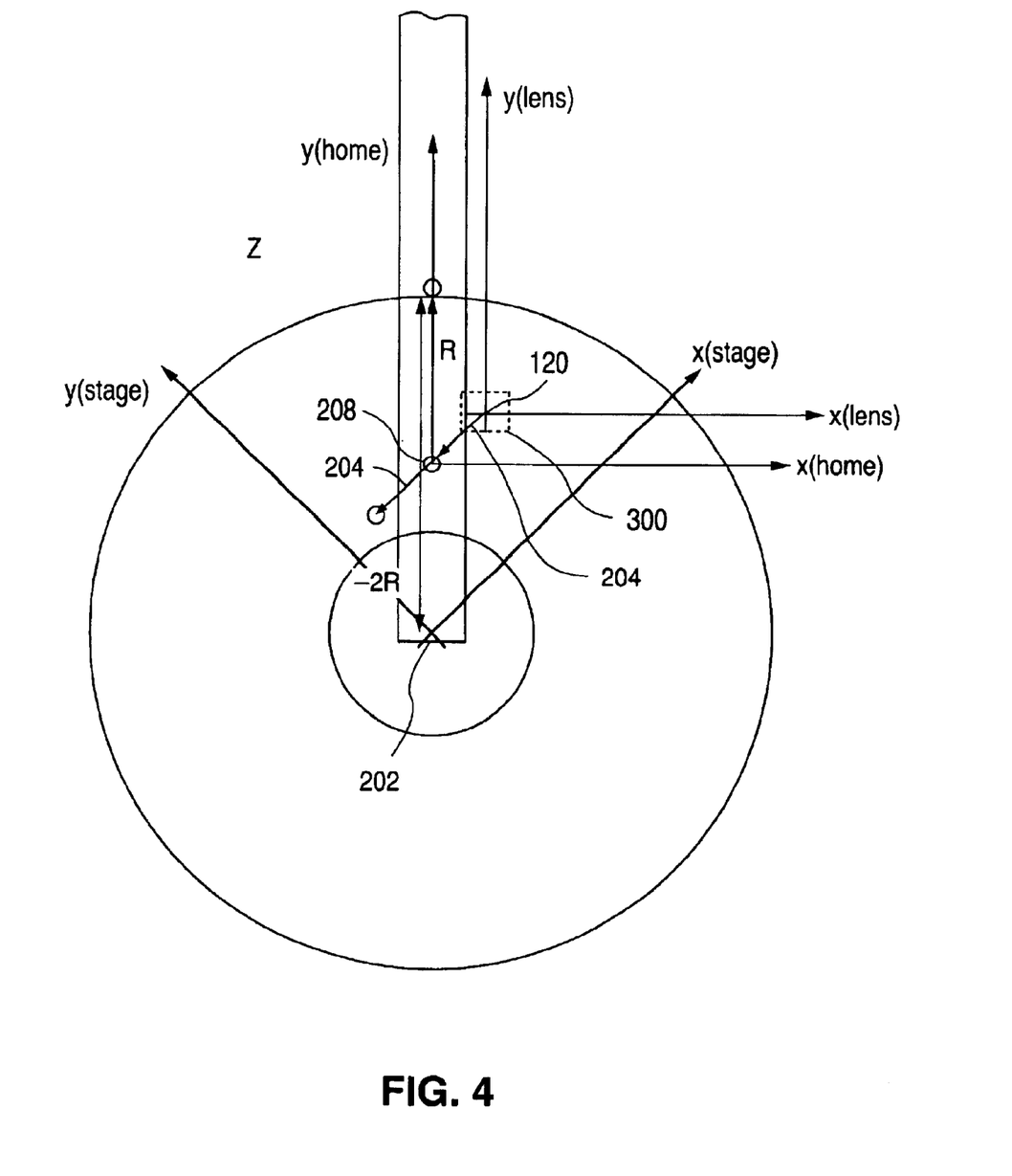
FIG. 4 is a view showing another step in the process of determining an offset between a filed of view and a center rotation of the R-theta stage.

Once the distinctive site 210 has been selected, the stage is rotated 180 degrees and moved a distance −2R. This rotation could be done by the operator using the operator control 110, or the processor system 112 could be programmed to automatically make this adjustment after the distinctive site 210 has been selected. This rotation and movement should bring the distinctive site 210 into the field of view of the lens 120, but the center of rotation 202 for the R-theta stage 101 is now on the other side of the lens 120. If there were no offset 204 between the lens 120 and the center of rotation of the stage at the home position (i.e. 0,0, in the home coordinate system) then this procedure would result in the distinctive site 210 being directly aligned with the center of objective lens 120. As shown in FIG. 4, however, due to the fact that the center of the lens 120 is offset from the center of the home coordinate system by a distance 204, the distinctive site 210 will not be aligned under the lens 120.

Figure 5:
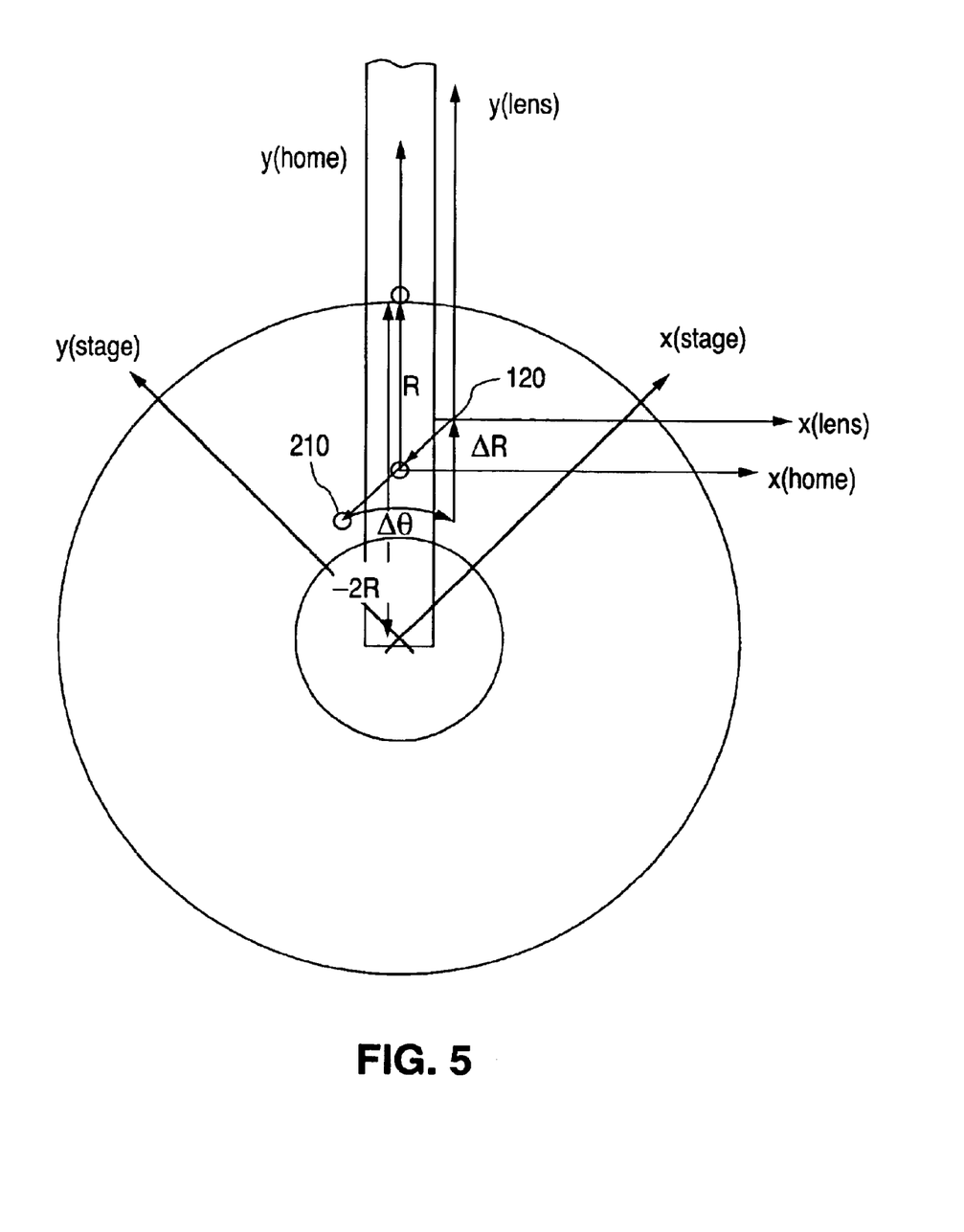
FIG. 5 is a view showing another step in the process of determining an offset between a filed of view and a center rotation of the R-theta stage.

At this point the operator should be able to view the distinctive site 210 in the field of view shown in the monitor 114. The operator controls are then used to move the chuck 102 such that the distinctive site 210 is positioned under the objective lens 120, which will result in the site 210 being visually positioned in the center of the field view. As shown in FIG. 5, the positioning of the distinctive site 210 under objective lens 120 is achieved by rotating the chuck an amount ΔΘ and moving the chuck an amount ΔR along the track 104. The processing system 112 stores the values of the angular ΔΘ and radial displacement ΔR and uses these values to calculate, among other things, the offset between the lens 120 and the center of rotation 202, where the chuck 102 is positioned at the origin 208. This offset is used to control the positioning of the chuck, so that the user can locate specific positions on a wafer under the lens 120.

The above steps can be repeated for several different points, preferably in different quadrants of the wafer. In addition, distinctive sites can be selected which are progressively farther away from the center of the wafer. The iterative process of determining the offset is complete when no user adjustments are needed to bring selected distinctive sites directly under the center of the lens after rotating 180 degrees and moving the stage a distance of −2R, and instead the processor system 112 is able to use the stored offset information is able to automatically bring the distinctive site under the lens after the 180 degree rotation and movement of −2R. In practice the user may find that a single iteration is enough to provide an accurate determination of the offset 204 between the lens 120 and the center of rotation 202 positioned at 208.

Figure 6:
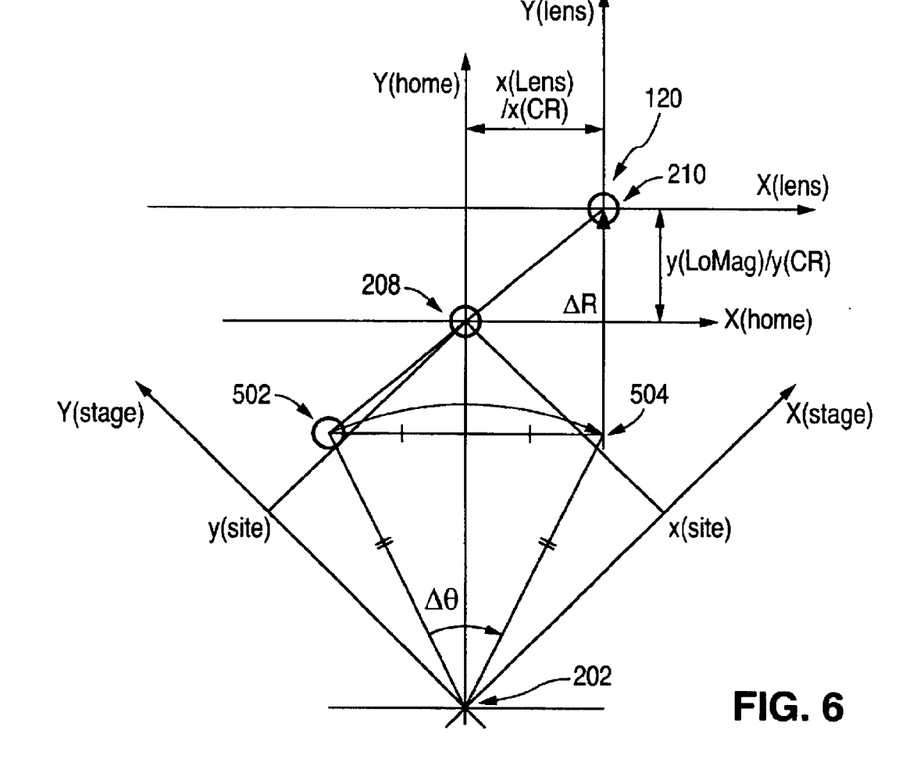
FIG. 6 is magnified view showing the step of FIG. 5.

FIG. 6 shows a magnified view of FIG. 5, and the positioning correction done to bring the distinctive site 210 directly under the lens 120. This figure is used to explain the equations which are used to determine the relationships between the home, lens and stage coordinate systems. The center of rotation of the stage 202 is initially positioned such that the distinctive site 210 is at point 502. The chuck is rotated (ΔΘ) such that the site 210 is moved to point 504. The chuck is then moved ΔR, which positions the site under the lens 120.

As is shown in FIG. 6, the difference in position along the Y (or R) axis between the center of rotation 202 when in the home position 208 and the of the objective lens 120 is equal to half ΔR, where ΔR is the distance which the stage must be moved to bring the distinctive site 210 under the lens 120. Determining the distance between x coordinates of the lens 120 and the center of rotation 202 in the home position 208 is more complicated.

Figure 7:
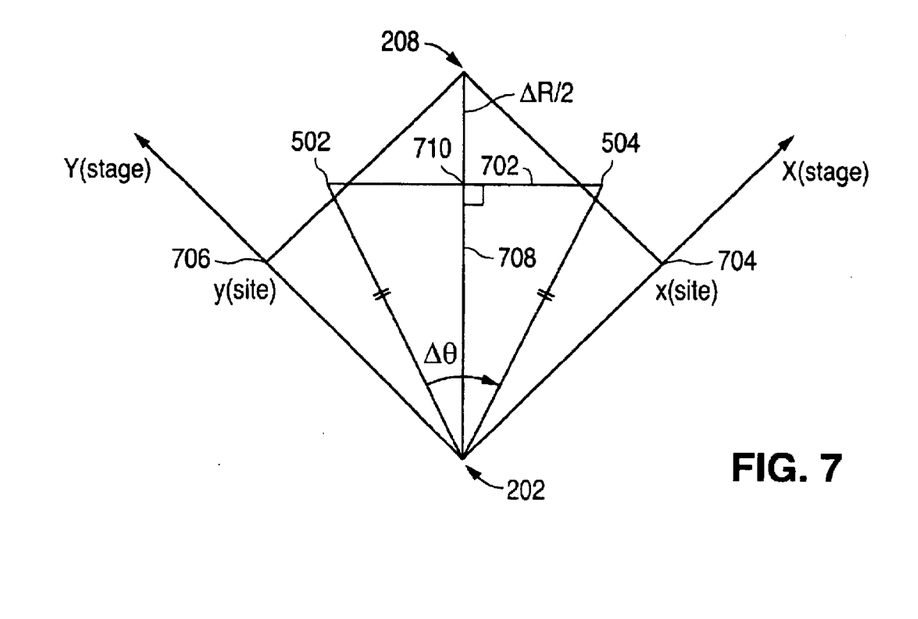
FIG. 7 is view of the step of the FIG. 5, which highlights dimensions used in the calculation of the offset between a field of view and a center rotation of the R-theta stage.

FIG. 7 corresponds to FIG. 6 and helps to illustrate the x offset calculation. The x(site) coordinate 704 can be determined because the position of the home coordinate system is known and was defined as the starting point. Similarly, the stage coordinate system is known, as it originally started in alignment with the home coordinate system (such that the center of rotation 202 was aligned with the origin 208 of the home coordination system), and the processor system 112 controlled the movement of the chuck 102, and stored the information regarding the movements of the chuck. Similarly, the y(site) 706 coordinate is known. The total distance from the center of rotation in the home position 208 to the center of rotation 202 of the chuck 102 as it is positioned after rotation by 180 degrees and moved −2R is shown as line 708 is determined by the following equation:

Total distance 208 to 202=$[x(site)^2+y(site)^2]^{1/2}$.

FIG. 6 shows that the distance from the line connecting point 502 to 504 to the point 208 is ΔR/2. The triangle defined by the line connecting 202 to 504, and the line 504 to 710 (line 702) and the line from 710 to 202 and be used to determine distance of line 702. The angle ΔΘ is known. The angle for the triangle with line 702 is ΔΘ/2. The line from 202 to 710 is equal to the line from (208 to 202)−ΔR/2. Thus, the tangent of ΔΘ/2 times the length of the line 710 to 202 gives the length of the line 702. Using these principles one can determine the position of the center of the lens 120 in the home coordinate system, and conversely one can determine the center of rotation for the stage in the home position in terms of the lens coordinates by the following equations.

| Lens in home coordinate system: | $y(lens) = \Delta R/2$ $x(lens) = \tan(\Delta\Theta/2) \cdot [(x(site)^2 + y(site)^2)^{1/2} - \Delta R/2]$ |
|---|---|
| Center of Rotation in Lens coordinate system | $y(CR) = -\Delta R/2 = -y(lens)$ $x(CR) = -\tan(\Delta\Theta/2) \cdot [(x(site)^2 + y(site)^2)^{1/2} - \Delta R/2] = -x(lens)$ |

Once the offset has been determined, internal software parameters used by the processor system 112 are updated with the last calculated coordinates of the center of rotation. They will be used later in software to compensate for the center of rotation offset, so that the user can determine the precise coordinates of the sites being observed using the optical inspection system, and the user can control the location of the wafer position and the lens.

It should be noted that operation described above provides for rotating the stage 180 degrees and moving the stage a distance of −2R from an initial position, and then moving the distinctive site under the lens. While this approach is relatively fast and efficient, any other approach for moving the wafer which results in the distinctive site being brought under the lens at a second position might be employed. For example, the operator might be given the control to simply drive the wafer around into a second position, aligning the lens with the distinctive site using the image system. The processor would then determine any difference between the actual stage coordinates corresponding to this second position with the expected stage coordinates had the lens and the center of rotation of the stage been aligned and use that difference to determine the offset.

The R-theta stage 101 and lens 120 are typically mounted in a manner so that they can operate for long periods of time without readjustment. The alignment procedure described herein should only need to be performed when the stage 101 or optical elements of the system are changed, moved or replaced. The method and system disclosed herein is particularly applicable for use rotatable stages, such as R-theta stages, but it should be noted that the method and system could also be utilized with other rotatable stages such as ½ X and ½ Y stages.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense. Further, even though only certain embodiments have been described in detail, those having ordinary skill in the art will certainly understand that many modifications are possible without departing from the teachings thereof. All such modifications are intended to be encompassed within the following claims.

What is claimed is:

1. An inspection system for inspecting samples, comprising:
    a polar coordinate stage having a chuck and a track, wherein the chuck and the track are coupled such that the chuck can be moved to different positions along the track, and wherein the chuck can be rotated about a center of rotation;
    an optical imaging system, having a field of view, which receives a probe beam reflected off a sample positioned on the chuck; and
    a processor system which controls the position of the chuck relative to the track, and uses first information derived from positioning a site on a sample in the field of view to determine an offset from a center of the field of view to the center of rotation of the polar coordinate stage, wherein the first information is used to determine a location of a site on a sample being inspected.

2. The inspection system of claim 1, wherein the first information is determined by positioning a first site in the field of view, and then rotating the chuck 180 degrees, and moving the chuck a distance equal to twice a first distance where the first distance corresponds to a distance between the chuck at the first position and a home position, and then positioning the first site in the field of view.

3. The inspection system of claim 2 further comprising:
    an operator control coupled to the processor such that an operator can control the position of the chuck; and
    wherein after the first site has been positioned in the field of view, and the chuck has been rotated 180 degrees and been moved a distance equal to twice the first distance, the operator uses the operator controls to position the first site in the field of view, and the processor system stores information which corresponds to an amount of rotation and an amount of movement necessary to position the first site in the field of view.

4. The inspection system of claim 2, wherein the processor is programmed such that after the first site is positioned in the field of view, the processor causes the chuck to rotate 180 degrees, and to move a distance equal to twice the first distance.

5. The inspection system of claim 4 further comprising:
    an operator control coupled to the processor such that an operator can control the position of the chuck; and
    wherein after the first site has been positioned in the field of view, and the chuck has been rotated 180 degrees and been moved a distance equal to twice the first distance, the operator uses the operator controls to position the first site in the field of view, and the processor system stores information which corresponds to the amount of rotation and movement necessary to position the first site in the field of view.

6. The inspection system of claim 1, wherein the first information is determined by positioning the chuck in a first position having a first site positioned in the field of view, where the first site is positioned in the field of view by rotating the chuck a first number of degrees, and moving the chuck a first distance from a home position, and then positioning the chuck in a second position by rotating the chuck 180 degrees, and moving stage a distance equal to twice the first distance, then rotating the chuck a second number of degrees $\Delta\Theta$ and moving the chuck a second distance $\Delta R$ to position the first site in the field of view, wherein the processor determines the position of the center of rotation in the home position, in terms of x and y coordinates when the chuck is in the second position, where these coordinates are referred to as x(site) and y(site); and where the processor is programmed to determine the first information using the following equations:

$$y(\text{lens}) = \Delta R/2, \text{ and}$$

$$x(\text{lens}) = \tan(\Delta\Theta/2) \cdot [(x(\text{site})^2 + y(\text{site})^2)^{1/2} - \Delta R/2].$$

7. In an inspection system having a processor system and a polar coordinate stage which includes a chuck for supporting a sample, a method for determining an offset between a center of rotation of a polar coordinate stage and a center of a field of view of an imaging system, the method comprising:
    moving the chuck to a first position which is a first distance from a home position, such that a first site is positioned in the field of view;
    rotating the chuck 180 degrees and moving the chuck twice the first distance, such that the chuck is in a second position;
    adjusting the position of the chuck such that the chuck is in a third position where the first site is positioned in the field of view;
    using a $\Delta\Theta$ degrees of rotation associated with adjusting the position of the chuck from the second position to the third position, and a distance $\Delta R$ associated with adjusting the position of the chuck from the second position to the third position, to determine the offset between the center of rotation of the polar coordinate stage when it is in the home position and the center of the field of view, and;
    using the offset to control the movement of the chuck to position a particular location on a wafer in the field of view.

8. The method of claim 7 further comprising:
programming the processor system to move the chuck from the first position to the second position.

9. The method of claim 8 further comprising:
transmitting operator inputs to the processor system, and in response the processor system causes the chuck to move from the second position to the third position.

10. The method of claim 7 further comprising:
determining an x coordinate, x(site), for a home position center of rotation in terms relative to the position of the chuck when it is in the second position; and
determining a y coordinate, y(site), for the home position center of rotation in terms relative to the position of the chuck when it is in the second position.

11. The method of claim 10 further comprising:
causing the processor to determine the offset from the field of view to the center of the rotation using the following equations, $$y(\text{lens})=\Delta R/2, \text{ and}$$

$$x(\text{lens})=\tan(\Delta\Theta/2)\cdot[(x(\text{site})^2+y(\text{site})^2)^{1/2}-\Delta R/2],$$

where y(lens) and x(lens) correspond to the position of the field of view relative to the center of rotation when the chuck is in the home position.

12. In an inspection system having an imaging system with a field of view, and a stage which includes a chuck for supporting a sample, a method for determining an offset between a center of rotation of the stage and a center of the field of view, the method comprising:
positioning the chuck in a first position based on a first site being positioned in the field of view;
positioning the chuck in a second position such that the fist site is positioned in the field of view;
determining the difference between the first position and the second position; and
using the difference between the first position and the second position to calculate the offset between the center of rotation of the stage and the center of the field of view.

13. The method of claim 12 further comprising using the offset to control the positioning of the chuck.

14. The method of claim 12 further comprising determining the difference between the first position and the second position and in terms of an angle of rotation, $\Delta\Theta$, and a distance of movement $\Delta R$.

15. The method of claim 14 further comprising:
determining x and y coordinates, x(site) and y(site), for a center of rotation in a home position relative to the chuck when it is in the first position.

16. The method of claim 14 further comprising:
determining a y dimension of the offset between the field of view and the center of rotation using the equation, $$y(\text{lens})=\Delta R/2.$$

17. The method of claim 15 further comprising:
determining a x dimension of the offset between the field of view and the center of rotation using the equation, $$x(\text{lens})=\tan(\Delta\Theta/2)\cdot[(x(\text{site})^2+y(\text{site})^2)^{1/2}-\Delta R/2].$$

18. The method of claim 15 further comprising:
determining a x dimension of the offset between the field of view and the center of rotation using the equation, $$x(\text{lens})=\tan(\Delta\Theta/2)\cdot[(x(\text{site})^2+y(\text{site})^2)^{1/2}-\Delta R/2]; \text{ and}$$

determining a y dimension of the offset between the field of view and the center of rotation using the equation, $$y(\text{lens})=\Delta R/2.$$

19. An inspection system for inspecting samples, comprising:
a stage having a chuck coupled to a track, such that the chuck can be moved to different positions along the track, and rotated about a center of rotation
an optical imaging system having a field of view; and
a processor system which controls the position of the chuck relative to the track, and uses first information corresponding to an offset between a center in the field of view and the center of rotation to determine a location of a site on a wafer being inspected.

20. In an inspection system having a stage with a center of rotation, and an imaging system with a field of view, a method for determining a location of a site on a wafer being inspected, the method comprising:
establishing a stage home position;
using a processor to control the position of the stage; and
using an offset between the center of rotation and a center of the field of view to determine the location of a site being inspected by the inspection system relative to the stage home position.

21. In an inspection system having a processor system and a stage which includes a chuck for supporting sample, a method for determining an offset between a center of rotation of a the stage and an imaging system having a center of a field of view the method comprising:
moving a chuck of the stage to a first position which is a first distance from a home position, such that a first site on a sample is positioned in a field of view;
moving the chuck to a second position where the first site is positioned in the field of view; and
using the difference between the second position and a third position where the chuck is rotated 180 degrees from the first position and moved twice the first distance from the first position, to determine the offset.

* * * * *